S. S. CASKEY.
VALVE PACKING.
APPLICATION FILED JAN. 12, 1910.
1,105,254.
Patented July 28, 1914.
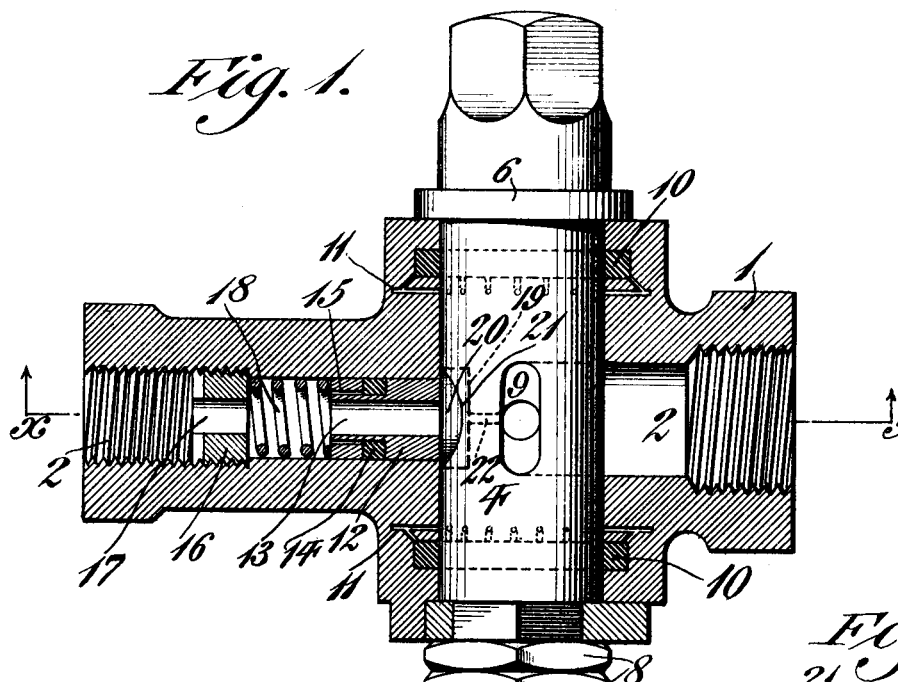
Fig. 1.
Fig. 3.
Fig. 4.
Fig. 5.
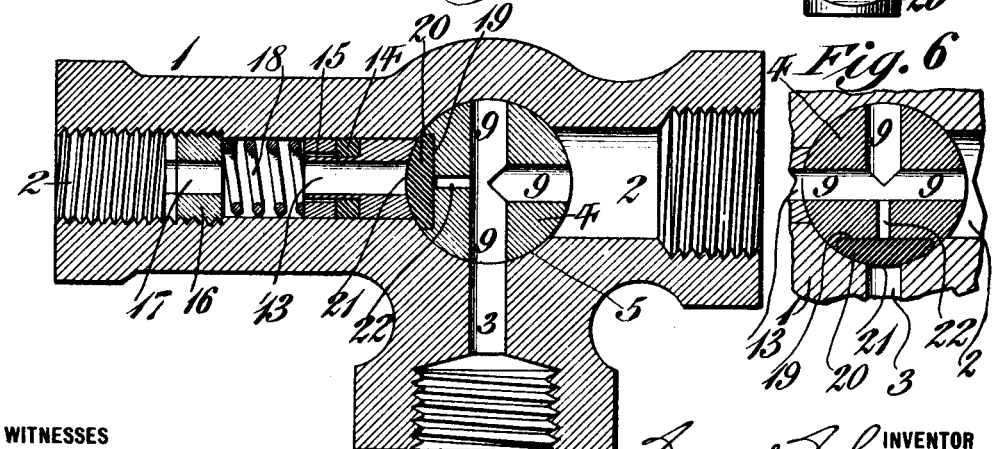
Fig. 2.
Fig. 6.
WITNESSES
L. Douville,
P. F. Nagle.
INVENTOR
Samuel S. Caskey.
BY
Wiederscheim & Fairbanks
ATTORNEYS

UNITED STATES PATENT OFFICE.

SAMUEL S. CASKEY, OF PHILADELPHIA, PENNSYLVANIA, ASSIGNOR TO CASKEY VALVE COMPANY, OF PHILADELPHIA, PENNSYLVANIA, A CORPORATION OF NEW YORK.

VALVE-PACKING.

1,105,254.      Specification of Letters Patent.      Patented July 28, 1914.

Application filed January 12, 1910. Serial No. 537,688.

*To all whom it may concern:*

Be it known that I, SAMUEL S. CASKEY, a citizen of the United States, residing in the city and county of Philadelphia, State of Pennsylvania, have invented a new and useful Valve-Packing, of which the following is a specification.

This invention relates to valve structures and more particularly to pressure packed valves for use in connection with all types of high pressure hydraulic work and especially in hydraulic ram operation and has for an object the prevention of leakage from the valve joints, connections or the like to the exhaust or exterior of the valve casing, as the case may be. It is well known that in hydraulic work especially where high pressures are used to force the fluid from one point to another by various conduits, the parts are subjected to a large amount of wear and if not closely looked after leakages develop which permit the pressure fluid to escape resulting in losses and inefficient results.

In my present invention I have devised a novel type of packing so arranged and positioned within the valve that the pressure of the fluid itself operates in conjunction with the packing to increase the efficiency of the latter and reduce the danger of leakage to a minimum.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section of a valve embodying my invention. Fig. 2 represents a section on line x—x, Fig. 1. Fig. 3 represents a top plan of a packing forming a part of my novel construction. Figs. 4 and 5 represent side elevations of the same. Fig. 6 represents a section showing certain parts of Fig. 2 in another position.

Similar numerals of reference indicate corresponding parts in the figures.

Referring to the drawings: 1 designates the casing of a valve embodying my invention, the same having a longitudinal bore 2 therethrough, transverse to which is an opening 3 forming a communication between the bore 2 and the exterior of the casing 1 and serving, in the present instance, the purpose of an exhaust for the pressure fluid. The bore 2 provides a passageway for the fluid under pressure when the valve casing is properly positioned in a pipe line, the said passageway being controlled by means of a plug 4 mounted in a suitable opening 5 of the casing 1. This plug 4 is preferably cylindrical and provided with a ground surface for contact with a similar surface of the opening 5, whereby a close fitting ground joint is formed. The plug 4 is rotatably mounted within the casing 1 having a bearing flange 6 at one end and at the other a screw threaded portion 7, with which coöperate suitable nuts 8 to hold the plug in proper position.

9 designates a three-way bore provided within the plug 4, whereby communication may be established between the opposite ends of the bore 2 or between one end of the bore 2 and the exhaust 3. As will be readily apparent, a simple turning of the plug 4 effects the desired result. As shown in Fig. 2 of the drawing, the plug 4 has been turned to form a communication between the hydraulic mechanism and the exhaust 3. In order to prevent leakage around the plug 4 to the exterior of the casing, I preferably provide a packing ring 10 on each side of the bore 2 adapted to effectually seal the joint between the plug 4 and the casing 1. In connection with the packing ring 10 it will be noted that I provide a plurality of ports 11 extending from the opening 5 into the casing 1 and terminating at a point back of the packing rings 10, whereby the latter are more closely compressed over the joint by any pressure fluid which may leak around the plug 4. In the present instance I preferably provide a sealing bushing 12 in the bore 2 on the pressure side of the valve for the purpose of forming a tighter joint between the plug 4 and the casing 1. This sealing bushing 12 has its inner face curved to correspond to the curvature of the plug 4, thus forming a ground joint connection to prevent escape of pressure fluid at this point. A suitable bore 13 is provided in the bushing 12 in order to permit the free flow of fluid from one side of the valve to the other and it will of course be understood that a suitable packing 14 is located between the valve casing 1 and the bushing 12 in order to prevent leakage between the joint thereof. In connection with the packing 14 it will be noted that suitable ports 15 are provided in the bushing 12 and leading to a point back of the packing 14 in order to permit the pressure fluid at all times to exert a compressing effect upon the packing in the direction of flow so as to more securely pack the joint.

16 designates a retaining collar, which is screwed or otherwise secured within the valve casing 1 at a suitable point with respect to the bushing 12, a bore 17 being provided therethrough to permit the uninterrupted flow of fluid. In some instances I may provide a spring 18 between the retaining collar 16 and the sealing bushing 12 which tends to assist in holding the bushing in proper position against the plug 4. When the fluid is passing through the valve to its work, the plug and sealing bushing are substantially balanced and the tendency of the pressure is to hold the plug 4 against the wall around the exhaust outlet 3, although there may be a slight leakage therebetween owing to wear and an object of my invention is to overcome this by providing a suitable packing acting as an auxiliary valve which is positioned to form a tight joint around the exhaust outlet 3 and it will be noted that the said auxiliary valve is preferably movable, means being provided for forcing or pressing it against the wall or seat around the outlet 3. As here shown I form a recess 19 in the plug 4, the said recess being so located as to come into alinement with the exhaust opening 3 as the plug 4 is turned to bring about a direct flow through the bore 2 from the source of supply to the ram or like device. Within the recess 19 a packing member 20 is located, the same as here shown being preferably of cylindrical shape and having a curved outer face 21 adapted to conform to the cylindrical exterior surface of the plug 4.

22 designates a port forming a communication between the recess 19 and the bore 9, whereby whatever pressure exists within the said bore 9 is led back of the packing 20 and acts thereupon to press the packing outwardly and in close contact with the walls of the casing 1, adjacent the exhaust opening 3, thus serving as an auxiliary valve.

It will now be apparent that I have devised a construction wherein the valve casing and its adjuncts contained therein while subjected to fluid pressure of very high intensity, are protected from leakage and the likelihood of any occurring at the joints is reduced to a minimum, since the pressure fluid itself is utilized to assist and maintain the packings absolutely tight over the joint they protect.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a device of the character stated, a casing having an opening therein, a bore therethrough and an exhaust bore, a rotatable plug in said opening having a passage therethrough and a branch therefrom, a packing seated in said plug the latter having a port leading from the passage to a point back of said packing, and a sealing bushing in the bore of said casing, said bushing abutting the plug in one position thereof and abutting said packing in another position of said plug and said packing adapted to seat on the wall around the exhaust bore when said bushing is abutting the plug.

2. In a device of the character stated, a casing having an opening therein, a bore therethrough and an exhaust bore, a rotatable plug in said opening having a passage therethrough and a branch therefrom, a packing seated in said plug, the latter having a port leading from the passage to a point back of said packing, and a sealing bushing in the bore of said casing, said packing adapted to seat on the wall around the exhaust bore in one position of the plug and said bushing abutting said packing in another position of the plug, said bushing being forced up against said packing by the pressure fluid in the valve whereby said bushing will be tightly held against the packing.

3. In a device of the character stated, a casing having an opening therein, a bore therethrough and an exhaust bore, a sealing bushing in the bore of said casing and in one position of the plug adapted to abut the same and to be forced thereagainst by the pressure fluid, packing between the bushing and the casing, a plug rotatably seated in said opening having a passage therethrough and a branch therefrom and a recess in the side opposite the branch, a port leading to said recess, a packing seated in said recess and adapted to seat on the wall around the exhaust bore in one position of the plug and to co-act with the sealing bushing in another position of the plug, whereby the sealing bushing will prevent leakage should the packing be forced inwardly by the pressure fluid.

4. In a device of the character stated, a casing having an opening therein, a bore therethrough and an exhaust bore, a rotatable plug in said opening having a passage therethrough and a branch therefrom, a movable means carried by said plug adapted to be actuated by pressure fluid to assist in preventing leakage between the plug and casing, said plug having a port leading from the passage to a point back of said movable means and a sealing bushing in the bore of said casing, said bushing abutting the plug in one position thereof and abutting said movable means in another position of said plug and said movable means adapted to seat on the wall around the exhaust bore when the bushing is abutting the plug.

5. In a device of the character stated, a casing having an opening therein, a bore therethrough and an exhaust bore, a rotatable plug in said opening having a passage therethrough and a branch therefrom, a movable means carried by said plug adapted to be actuated by pressure fluid to assist in preventing leakage between the plug and the casing and a sealing bushing in the bore of said casing, said bushing abutting said plug in one position thereof and abutting said movable means in another position of said plug, and said movable means being adapted to seat on the wall around the exhaust bore when the bushing is abutting the plug.

SAMUEL S. CASKEY.

Witnesses:
C. D. McVay,
F A. Newton.